United States Patent [19]

Tartaglia

[11] Patent Number: 4,461,410
[45] Date of Patent: Jul. 24, 1984

[54] AUTOMOBILE BICYCLE CARRYING RACK

[76] Inventor: Paul Tartaglia, 12414 Veronica Cir., Dallas, Tex. 75234

[21] Appl. No.: 336,947

[22] Filed: Jan. 4, 1982

[51] Int. Cl.$^3$ .............................................. B60R 9/10
[52] U.S. Cl. ..................... 224/42.03 B; 224/42.45 R
[58] Field of Search ................ 224/42.03 R, 42.03 A, 224/42.45 R, 42.03 B

[56] References Cited

U.S. PATENT DOCUMENTS

| | | | |
|---|---|---|---|
| 2,867,402 | 1/1959 | Graybill et al. | 224/42.03 R X |
| 2,919,946 | 1/1960 | Miener | 224/42.03 R |
| 4,136,806 | 1/1979 | Wisz | 224/42.03 R X |
| 4,301,953 | 11/1981 | Abbott | 224/42.03 B |
| 4,318,501 | 3/1982 | Graber | 224/42.03 B X |
| 4,380,344 | 4/1983 | Abbott | 224/42.03 B X |

*Primary Examiner*—Steven M. Pollard

[57] ABSTRACT

An automobile bicycle carrying rack attached to an automobile trailer hitch tongue is disclosed. The automobile bicycle carrying rack is made of metal, and unique means are provided for fastening the bicycle carrying rack to the tongue of a trailer hitch.

1 Claim, 3 Drawing Figures

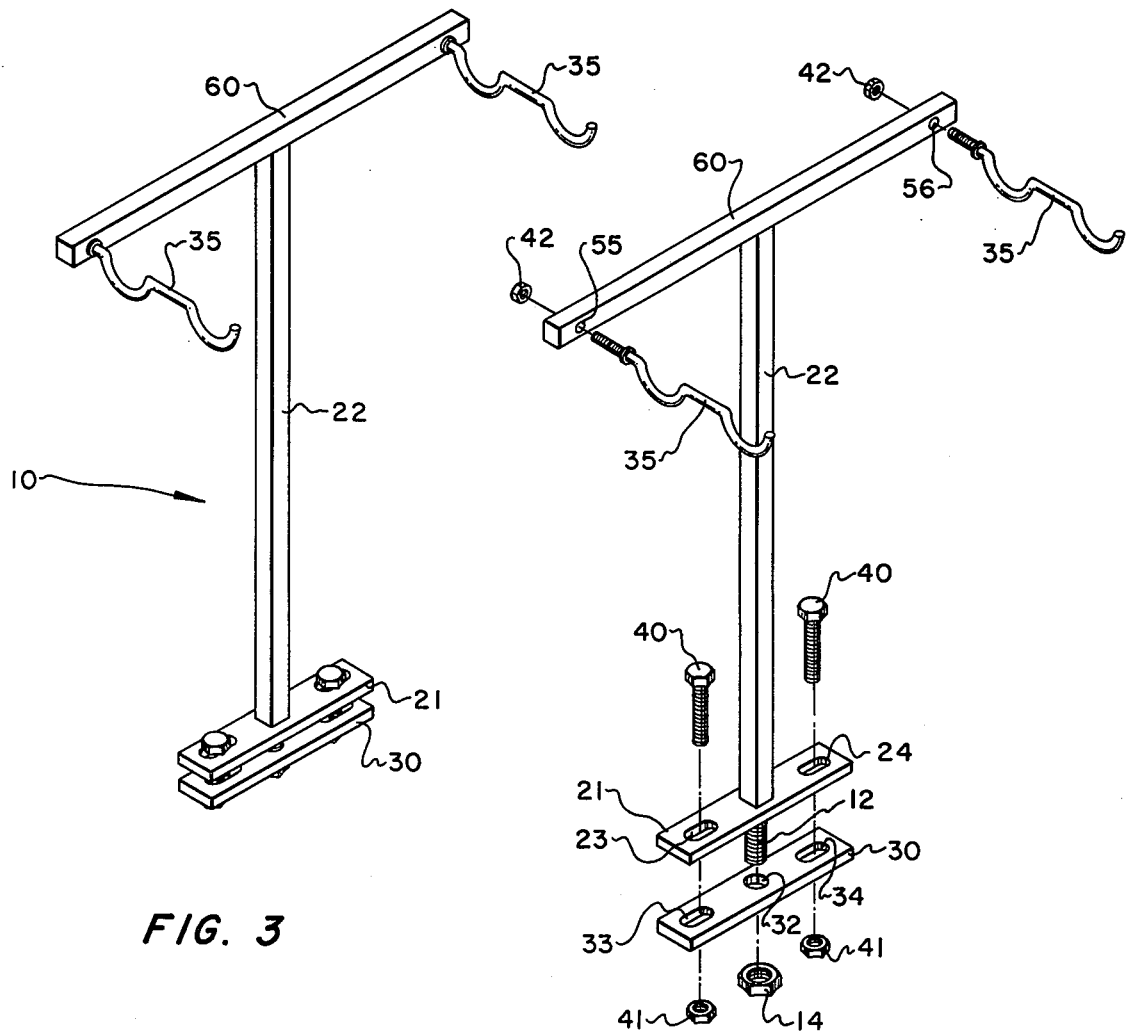
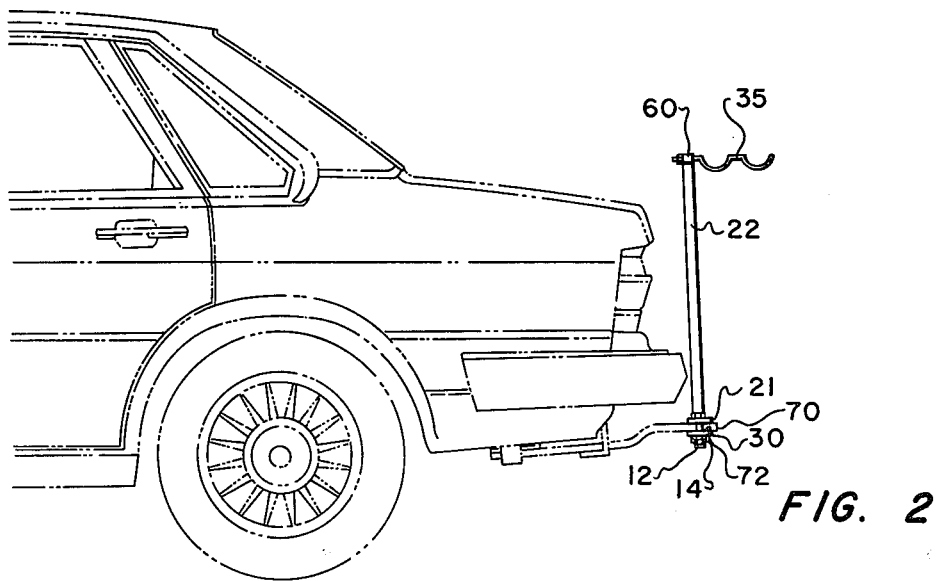

AUTOMOBILE BICYCLE CARRYING RACK

BACKGROUND OF THE INVENTION

This invention relates to an automobile bicycle carrying rack which is uniquely attached to the tongue of an automobile trailer hitch.

The advent of the energy crisis and proliferation of compact and sub-compact automobiles has left little room in an automobile to carry a bicycle that would normally fit into the trunk of a mid-size and full size automobile.

The present invention provides for a completely detachable automobile bicycle carrying rack which is uniquely attached to the tongue of an automobile trailer hitch. When attached to the tongue of a trailer hitch, the bicycle carrying rack provides a means for transporting two bicycles that otherwise could not be carried for lack of trunk space.

Additional advantages of the bicycle carrying rack are that there are no unsightly brackets left on the bumper when the bicycle carrying rack is removed. The bicycle carrying rack can be used on any automobile that has a trailer hitch tongue.

SUMMARY OF THE INVENTION

In accordance with the present invention, there is provided an automobile bicycle carrying rack which is uniquely fastened to the tongue of an automobile trailer hitch. The bicycle carrying rack is made of metal and provides a means for transporting bicycles that otherwise could not be carried by compact and sub-compact automobiles. The bicycle carrying rack also has a means for complete removal.

BRIEF DESCRIPTION OF THE DRAWINGS

FIG. 1 is an exploded perspective view of an automobile bicycle carrying rack according to the invention.

FIG. 2 is a side elevation view of the bicycle carrying rack of FIG. 1 uniquely mounted on the tongue of a trailer hitch.

FIG. 3 is a perspective view of the bicycle carrying rack when not attached.

DESCRIPTION OF THE PREFERRED EMBODIMENT

FIGS. 1, 2, and 3 show an automobile bicycle carrying rack, indicated generally by the reference numeral 10. Preferably, the material of 10 is a combination of steel square tubing 22, steel extended hooks 35, and flat steel 21 and 30, as shown in FIG. 1.

As shown in FIG. 2, the bicycle carrying rack post 22 is fastened to the tongue 70 of a trailer hitch by means of a threaded rod 12 inserted through hole 72 in the tongue. The support plate 30 is placed on the underside of the hitch tongue 70 with the threaded rod 12 inserted through the support plate 30 hole 32 and fastened with nut 14. Slotted holes 23 and 24 in the post plate 21 and slotted holes 33 and 34 in the support plate 30 are aligned and bolt 40 is inserted through post plate 21 slotted hole 23 and support plate 30 slotted hole 33 and fastened with nut 41. Bolt 40 is inserted through post plate 21 slotted hole 24 and support plate 30 slotted hole 34 and fastened with nut 41. The steel extended hook 35 is inserted through post top 60 hole 55 and fastened with nut 42, and steel extended hook 35 is inserted through post top hole 56 and fastened with nut 42.

Although preferred embodiments of the invention have been described in detail, it is to be understood that various changes, substitutions and alterations can be made therein without departing from the spirit and scope of the invention.

Having thus described my invention, what I claim and desire to protect by Letters Patent of the United States is:

1. A bicycle carrier rack for attachment to a trailer hitch mounted on an automotibe vehicle, said trailer hitch comprising a tongue with a hole there through, the improvement comprising: said carrier rack having a single vertically oriented post member and an upper horizontally oriented cross member attached to the upper end of said post member, said cross member having a pair of hook members extending therefrom for receiving a bicycle, said post member having a post plate attached to the lower end thereof, said post plate having a pair of slotted holes and a threaded rod extending therefrom for insertion through said tongue hole, a support plate having a central hole adapted to receive the threaded rod and a pair of slotted holes corresponding to the slotted holes in the post plate, threaded bolts to pass through the slotted holes for securing the plates together with the tongue there between and a nut to be threadably received on the rod member.

* * * * *